(12) United States Patent
Ryu et al.

(10) Patent No.: US 11,873,232 B2
(45) Date of Patent: Jan. 16, 2024

(54) METHOD FOR PRODUCING HEXAGONAL TUNGSTEN OXIDE AND METHOD FOR PRODUCING ELECTROCHROMIC DEVICE INCLUDING THE SAME

(71) Applicant: ELECTRONICS AND TELECOMMUNICATIONS RESEARCH INSTITUTE, Daejeon (KR)

(72) Inventors: Hojun Ryu, Seoul (KR); Doo-Hee Cho, Daejeon (KR); Juhee Song, Daejeon (KR); Chil Seong Ah, Daejeon (KR); Sang Hoon Cheon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 118 days.

(21) Appl. No.: 17/477,182

(22) Filed: Sep. 16, 2021

(65) Prior Publication Data

US 2022/0169531 A1 Jun. 2, 2022

(30) Foreign Application Priority Data

Dec. 1, 2020 (KR) .......................... 10-2020-0165384
Mar. 17, 2021 (KR) .......................... 10-2021-0034545

(51) Int. Cl.
*C01G 41/02* (2006.01)
*G02F 1/1524* (2019.01)
*B82Y 40/00* (2011.01)

(52) U.S. Cl.
CPC ........... *C01G 41/02* (2013.01); *G02F 1/1524* (2019.01); *B82Y 40/00* (2013.01); *C01P 2004/22* (2013.01);
(Continued)

(58) Field of Classification Search
CPC ....... C01G 41/02; G02F 1/1524; B82Y 40/00; C01P 2004/22; C01P 2004/64; C01P 2006/60; C01P 2002/72; C01P 2004/84
See application file for complete search history.

(56) References Cited

U.S. PATENT DOCUMENTS

| 9,581,876 | B1 | 2/2017 | Cho et al. |
| 10,281,792 | B2 | 5/2019 | Kim et al. |
| 2020/0089073 | A1 | 3/2020 | Koo |

FOREIGN PATENT DOCUMENTS

| KR | 101158425 B1 | 7/2012 |
| KR | 101175607 B1 | 8/2012 |

(Continued)

OTHER PUBLICATIONS

Cremonesi et al. Journal of Non-Crystalline Solids 2004, 345346 500-504 (Year: 2004).*

(Continued)

*Primary Examiner* — Anthony J Zimmer
*Assistant Examiner* — Jordan W Taylor (57) ABSTRACT

Provided is a method for producing hexagonal tungsten oxide, the method including preparing an alkaline solvent having a pH of 8 to 9, which contains at least one of water or alcohol, adding tungsten chloride to the alkaline solvent to form a first reaction solution, adding an additive to the first reaction solution to form a second reaction solution, and adding strong acid to the second reaction solution to form nanoparticles. The additive includes any one of an amine compound having 1 to 8 carbon atoms or an aliphatic hydrocarbon derivative having 10 or more carbon atoms.

16 Claims, 4 Drawing Sheets

(52) U.S. Cl.
CPC ...... *C01P 2004/64* (2013.01); *C01P 2006/60* (2013.01)

(56) References Cited

FOREIGN PATENT DOCUMENTS

| | | |
|---|---|---|
| KR | 1020170104269 A | 9/2017 |
| KR | 101788084 B1 | 10/2017 |
| KR | 102092265 B1 | 3/2020 |
| WO | 2014142066 A1 | 9/2014 |

OTHER PUBLICATIONS

Hariharan et al. Talanta 85 (2011) 2166- 2174 (Year: 2011).*
Salmauoui et al. Applied Surface Science 257 (2011) 8223-8229 (Year: 2011).*

* cited by examiner

METHOD FOR PRODUCING HEXAGONAL TUNGSTEN OXIDE AND METHOD FOR PRODUCING ELECTROCHROMIC DEVICE INCLUDING THE SAME

CROSS-REFERENCE TO RELATED APPLICATIONS

This U.S. non-provisional patent application claims priority under 35 U.S.C. § 119 of Korean Patent Application Nos. 10-2020-0165384, filed on Dec. 1, 2020, and 10-2021-0034545, filed on Mar. 17, 2021, the entire contents of which are hereby incorporated by reference.

BACKGROUND

The present disclosure herein relates to a method for producing hexagonal tungsten oxide and a method for producing an electrochromic device including the same.

Electrochromic refers to a phenomenon in which coloring and bleaching reversibly occur due to external electrochemical stimuli. In general, electrochromic takes place through a process of insertion/extraction of electrons and ions ($H^+$ and $Li^+$) into/from cathodic/anodic coloration materials. Tungsten oxide ($WO_3$) is a typical electrochromic material. Tungsten oxide is a cathodic coloration material, and is deposited on a transparent electrode (positive electrode) for device implementation.

Tungsten oxide has multiple phases. Tungsten oxide is present as a monoclinic phase at room temperature.

Monoclinic tungsten oxide is generally present as particles having a plate shape. When a thin film containing monoclinic tungsten oxide nanoparticles is formed, the inter-particle distances of the particles are small, and the charge mobility of electrolytes such as $Li^+$ and $H^+$ ions is low. Accordingly, an electrochromic device made of a monoclinic nanoparticle thin film has a slow discoloration rate and poor stability between coloring and bleaching.

Particles growing as a hexagonal crystal phase generally have a needle shape as one-dimensional growth. The particles grown into needle-shaped crystals, when formed into a thin film, have a relatively low density of the thin film and wide voids therebetween. As a result, the thin film has an increase in specific surface area. Accordingly, the charge mobility of electrolytes such as $Li^+$ and $H^+$ ions is high. An electrochromic device made of a hexagonal tungsten oxide nanoparticle thin film has a fast discoloration rate and improved coloring-bleaching cycle stability.

Without a particular process, tungsten oxide is grown as monoclinic tungsten oxide, and thus, a number of studies have been made to achieve hexagonal tungsten oxide.

SUMMARY

The present disclosure provides a method for producing hexagonal tungsten oxide without a high temperature and high pressure process.

An embodiment of the inventive concept provides a method for producing hexagonal tungsten oxide, the method including preparing an alkaline solvent having a pH of 8 to 9, which contains at least one of water or alcohol, adding tungsten chloride to the alkaline solvent to form a first reaction solution, adding an additive to the first reaction solution to form a second reaction solution, and adding strong acid to the second reaction solution to form nanoparticles, wherein the additive may include any one of an amine compound having 1 to 8 carbon atoms or an aliphatic hydrocarbon derivative having 10 or more carbon atoms.

According to some embodiments, the amine compound may contain at least one of urea, monoethanolamine, aniline, or octylamine.

According to some embodiments, the amine compound may be added in an amount of about 300 mol % to about 1200 mol % of an added amount of the tungsten chloride.

According to some embodiments, the aliphatic hydrocarbon derivative may contain at least one of polyethylene glycol, poly(methyl methacrylate), polyacrylamide, polyvinyl alcohol, or hexadecylamine.

According to some embodiments, the aliphatic hydrocarbon derivative may be added in an amount of about 30 mol % to about 120 mol % of an added amount of the tungsten chloride.

According to some embodiments, the preparing of the first reaction solution, the preparing of the second reaction solution, and the adding of strong acid to the second reaction solution may be performed at 60° C. to 80° C.

According to some embodiments, the method may further include cooling the resultant mixture to room temperature after the adding of the strong acid to precipitate the nanoparticles, separating the precipitated nanoparticles through a centrifugal separation method, washing and drying the separated nanoparticles, and heat treating the dried nanoparticles to form dry powder.

According to some embodiments, the method may include mixing the dry powder with a solvent and weak acid to prepare a slurry, applying the slurry onto a positive electrode to form a coating film, disposing a negative electrode spaced apart from the positive electrode with the coating film therebetween, and inserting an electrolyte between the coating film and the negative electrode.

According to some embodiments, the solvent may contain at least one of water or alcohol, and the weak acid may contain at least one of tetra-ethoxysilane (TEOS), acetic acid, or poly(metacrylic acid).

In an embodiment of the inventive concept, a method for producing hexagonal tungsten oxide includes preparing a solvent containing at least one of water or alcohol, adding an alkali salt to the solvent to form an alkaline solvent, adding tungsten chloride to the alkaline solvent to form a first reaction solution, adding an additive to the first reaction solution to form a second reaction solution, and adding strong acid to the second reaction solution to form nanoparticles, wherein the additive may contain at least one of urea, monoethanolamine, or polyethylene glycol, and the number of moles of the added strong acid may be greater than the sum of the number of moles of the tungsten chloride and the number of moles of the additive.

According to some embodiments, the number of moles of the strong acid added may be at least 1.1 times or more of the sum of the number of moles of the tungsten chloride and the number of moles of the additive.

In an embodiment of the inventive concept, a method for producing hexagonal tungsten oxide includes preparing a solvent containing at least one of water or alcohol, adding an alkali salt to the solvent to form an alkaline solvent having a pH of 8 to 9, adding an additive to the alkaline solvent to form a first reaction solution, adding tungsten chloride to the first reaction solution to form a second reaction solution, and adding strong acid to the second reaction solution to form nanoparticles, wherein the additive may contain at least one of urea, monoethanolamine, or polyethylene glycol, and the preparing of the first reaction solution, the preparing of the second reaction solution, and the adding of strong acid to the second reaction solution may be performed at 60° C. to 80° C.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

In order to fully understand the configuration and effects of the inventive concept, preferred embodiments of the inventive concept will be described with reference to the accompanying drawings. However, the inventive concept may be embodied in different forms and variously modified and changed, and should not be constructed as limited to the embodiments set forth herein. Rather, these embodiments are provided so that this disclosure will be thorough and complete, and will fully convey the scope of the inventive concept to those skilled in the art. In the drawings, the sizes of respective elements are exaggerated for convenience of description, and the ratios of respective elements may be exaggerated or reduced.

Figure 1:
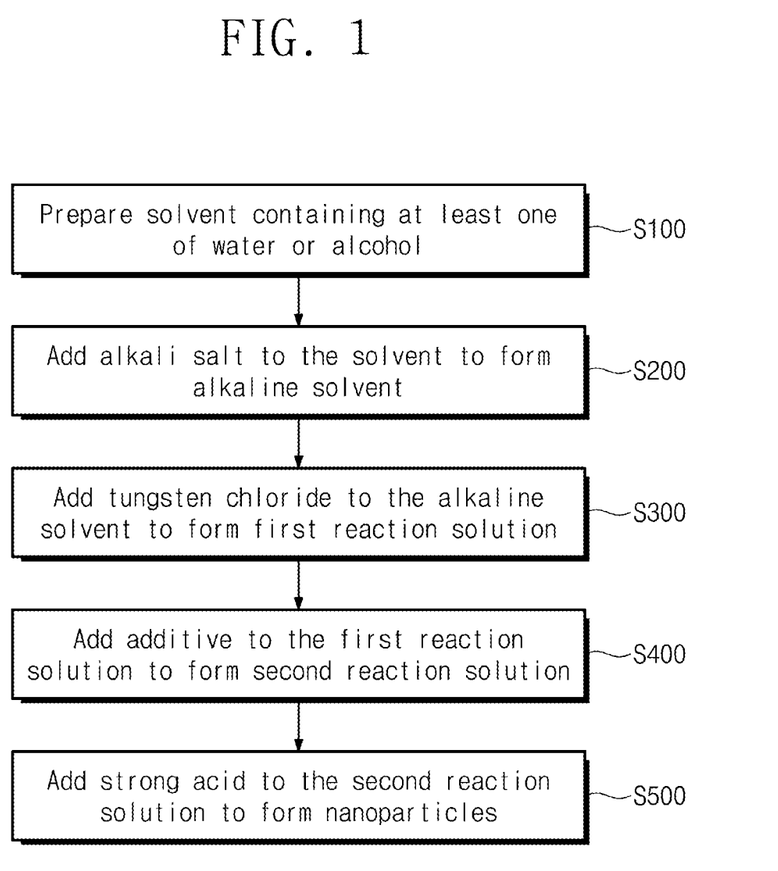
FIG. 1 is a flowchart illustrating a method for producing hexagonal tungsten oxide according to the inventive concept.

FIG. 1 is a flowchart illustrating a method for producing hexagonal tungsten oxide according to the inventive concept. All processes of the production method below may be performed at atmospheric pressure without additional high pressure.

Referring to FIG. 1, an alkaline solvent containing at least one of water or alcohol may be prepared (S100). The water may be, for example, distilled water. The alcohol may include, for example, at least one of methanol, ethanol, isopropyl alcohol, n-butanol, ethylene glycol, or the like.

An alkali salt or aqueous ammonia is added to in a solvent and dissolved to turn the solvent into an alkaline solvent (S200). The alkali salt may include, for example, at least one of NaOH, KOH, or Ca(OH)$_2$. The dissolving of the alkaline solvent may be performed at 20° C. to 80° C. The alkaline solvent may be controlled to have a pH of 8 to 9. When the alkaline solvent has a pH of less than 8, tungsten chloride may not be well dissolved in the alkaline solvent in the next process (see S300). When the alkaline solvent has a pH of greater than 9, in the next process of adding strong acid, tungsten oxide particles may be slowly generated, and the final tungsten oxide particles may be added in an amount less than the added amount of tungsten chloride (see S500).

Then, tungsten chloride (WCl$_6$) may be added to the alkaline solvent and dissolved to prepare a first reaction solution (S300). The dissolving of tungsten chloride (WCl$_6$) may be performed 60° C. to 80° C.

An additive may be added and dissolved to the first reaction solution and dissolved to prepare a second reaction solution (S400). The dissolving of the additive may be performed at 60° C. to 80° C.

The additive may contain an amine compound or an aliphatic hydrocarbon derivative.

The amine compound may contain urea, monoethanolamine, aniline, octylamine, or the like. The amine compound may contain 8 carbons or less.

The aliphatic hydrocarbon derivative may contain more than 10 carbons. The aliphatic hydrocarbon derivative may contain polyethylene glycol (PEG), poly(methyl methacrylate) (PMMA), polyacrylamide, polyvinyl alcohol, hexadecylamine, or the like.

For example, for an amine compound which contains at least one of urea or monoethanolamine, the amine compound may be added in an amount of 300 mol % to 1200 mol % of tungsten chloride dissolved in the first reaction solution.

For another example, for an aliphatic hydrocarbon derivative which contains polyethylene glycol (PEG), the aliphatic hydrocarbon derivative may have a mass of 1000 g/mol or less. The aliphatic hydrocarbon derivative may be added in an amount of 30 mol % to 120 mol % of tungsten chloride dissolved in the first reaction solution.

Strong acid may be added to the second reaction solution to form nanoparticles (S500). The formed nanoparticles may be hexagonal tungsten oxide particles. In the present description, the strong acid may be defined as an acid having a pH of 3 or less. The adding of the acid may be performed at 60° C. to 80° C. The strong acid may contain at least one of nitric acid (HNO$_3$) or hydrochloric acid (HCl). The number of moles of the strong acid to be added may be greater than the sum of the number of moles of tungsten chloride and the number of moles of the alkali salt. For example, the number of moles of the strong acid may be 1.1 times or more of the sum of the number of moles of tungsten chloride and the number of moles of the alkali salt. When the strong acid is added less than the above ratio, tungsten oxide particles may be slowly generated, and the amount of tungsten oxide particles generated is much less than the amount of tungsten chloride added. The reaction of the strong acid addition may be performed by slowly dropping the strong acid in small drops to cause slow changes in pH. When the strong acid is added fast, the tungsten oxide particles generated may rapidly agglomerate and increase in size.

The order that the first reaction solution preparation process and the second reaction solution preparation process are performed may alter in reverse. That is, the additive may be first dissolved in an alkaline solvent, and tungsten chloride may be additionally dissolved.

Then, the resultant may be cooled to room temperature to precipitate tungsten oxide nanoparticles. The precipitated nanoparticles may be separated through a centrifugal separation method. The separated nanoparticles may be washed and dried. The dried nanoparticles may be heat treated to form dry powder.

Experimental Example 1

200 g of distilled water was added to 100 g of ethylene glycol to prepare a solvent. At room temperature, 5 g of sodium hydroxide was added to the solvent and dissolved to prepare an alkaline solvent. Thereafter, the temperature was raised up to 80° C. 10 g of tungsten chloride was added to the alkaline solvent and dissolved to form a first reaction solution. 10 g of urea was added to the first reaction solution and dissolved to form a second reaction solution. 18 g of nitric acid (70%) and 15 g of distilled water were added to the second reaction solution, and the mixture was dropped for 60 minutes to form a resulting solution. The resulting solution was kept at 80° C. with stirring for 4 hours.

The stirring was discontinued, the resulting solution was cooled to room temperature, and tungsten oxide particles were separated through a centrifugal separation method. The tungsten oxide particles were washed with methanol and dried, and then heat treated at 350° C. in air to form dry powder.

Experimental Example 2

50 g of distilled water was added to 100 g of ethylene glycol to prepare a solvent. At room temperature, 18 g of sodium hydroxide was added to the solvent and dissolved to prepare an alkaline solvent. Thereafter, the temperature was raised up to 80° C. 22 g of tungsten chloride was added to the alkaline solvent and dissolved to form a first reaction solution. 22 g of polyethylene glycol was added to the first reaction solution and dissolved to form a second reaction solution. 35 g of nitric acid (70%) and 65 g of distilled water were added to the second reaction solution, and the mixture was dropped for 60 minutes to form a resulting solution. The resulting solution was kept at 80° C. with stirring for 4 hours.

The stirring was discontinued, the resulting solution was cooled to room temperature, and tungsten oxide particles were separated through a centrifugal separation method. The tungsten oxide particles were washed with methanol and dried, and then heat treated at 350° C. in air to form dry powder.

Comparative Example

Unlike Experimental Examples 1 and 2, experiments were conducted substantially in the same manner as in Experimental Examples 1 and 2, except that an alkaline solvent was not formed and no additives were added.

100 g of ethylene glycol was prepared as a solvent. 10 g of tungsten chloride was added to the solvent and dissolved to form a reaction solution. 20 g of nitric acid (70%) and 200 g of distilled water were added to the reaction solution, and the mixture was dropped for 60 minutes to form a resulting solution. The resulting solution was kept at 80° C. with stirring for 4 hours.

The stirring was discontinued, the resulting solution was cooled to room temperature, and particles were separated through a centrifugal separation method. The particles were washed with methanol and dried, and then heat treated at 350° C. in air to form dry powder.

Figure 2:
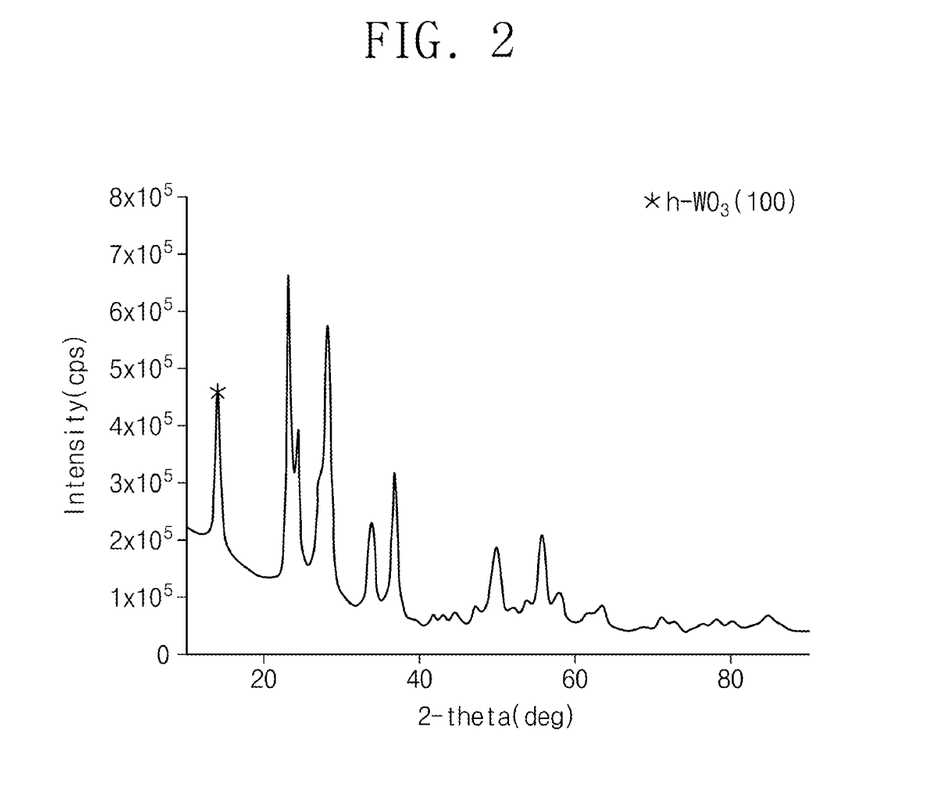
FIG. 2 is an XRD (X Ray Diffraction) graph of Experimental Example 1.
Figure 3:
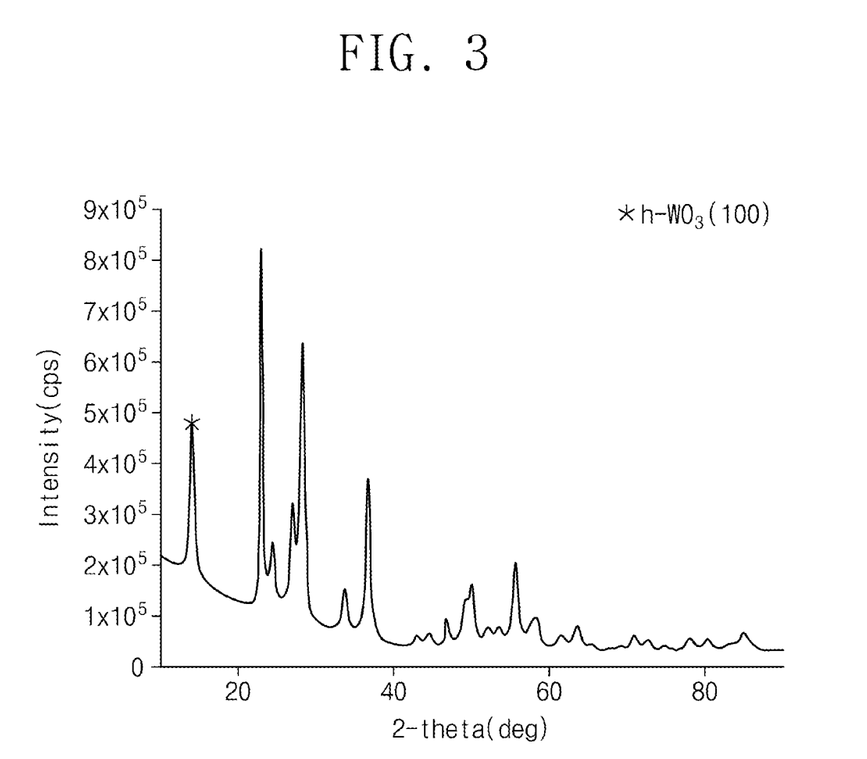
FIG. 3 is an XRD graph of Experimental Example 2.
Figure 4:
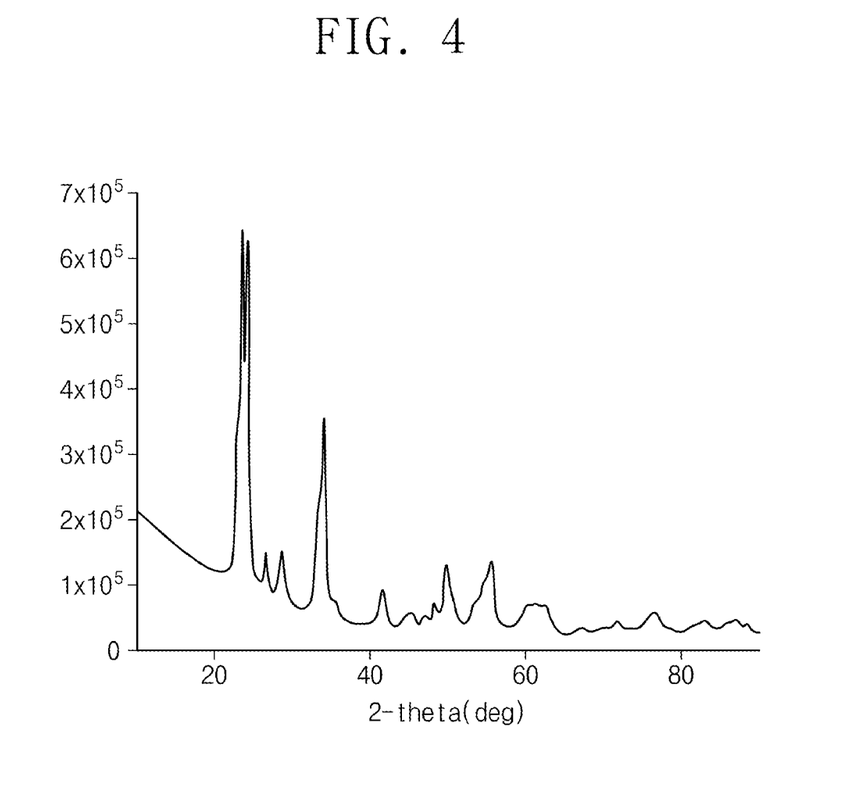
FIG. 4 is an XRD graph of Comparative Example.

FIG. 2 is an XRD graph of Experimental Example 1. FIG. 3 is an XRD graph of Experimental Example 2. FIG. 4 is an XRD graph of Comparative Example.

Referring to FIGS. 2 and 3, a peak at the bold (100) plane of hexagonal tungsten oxide was observed. In contrast, in Comparative Example, a peak of monoclinic tungsten oxide, not the hexagonal tungsten oxide, was observed. That is, when comparing Experimental Examples 1 and 2 with Comparative Example, it is seen that the hexagonal tungsten oxide is formed depending on the use of an alkaline solvent and the use of an additive.

The dry powder formed according to the inventive concept may be put into a ball mill together with a solvent and weak acid, and milled to prepare a slurry.

The solvent may contain any one of water, alcohol, or a mixture of water and alcohol. The alcohol may contain any one of methanol, ethanol, isopropyl alcohol, n-butanol, or ethylene glycol. The weak acid may contain at least one of tetra-ethoxysilane (TEOS), acetic acid, or poly(metacrylic acid). In the present description, the weak acid may be defined as an acid having a pH of 3.5 to 7. The mixed solution of the solvent and the heat treated powder in an amount of 10 to 25 wt % may be mixed with the weak acid in an amount of 0.1 to 10 wt %.

Then, the slurry may be subjected to a solution coating method such as spin coating or dip coating to form a coating film on a positive electrode. The positive electrode, may be, for example, an ITO electrode. A negative electrode may be fixed on the opposite side to the positive electrode, and then an electrolyte may be inserted therebetween and sealed to produce an electrochromic device.

Coating Film Containing Hexagonal Tungsten Oxide According to Experimental Example 1

4 g of dry powder according to Experimental Example 1, 20 g of ethanol, 0.3 g of TEOS, 0.7 g of distilled water, 0.007 g of hydrochloric acid, and 0.04 g of polymethyl methacrylate (PMAA) were put into a ball mill and milled for 5 days to prepare a slurry. The slurry was spin-coated on ITO at 1200 rpm for 30 seconds to form a coating film.

When the transparency of the coating film was measured, the haze index was transparent at 4.8%. It is seen that the tungsten oxide particles have a size of less than 550 nm, which is the central wavelength of visible light. A SEM image confirmed that the particles constituting the coating film were observed to have a size of 50 nm.

Coating Film Containing Hexagonal Tungsten Oxide According to Experimental Example 2

4 g of heat treated powder according to Experimental Example 2, 20 g of ethanol, 0.3 g of TEOS, 0.7 g of distilled water, 0.007 g of hydrochloric acid, and 0.04 g of polymethyl methacrylate (PMAA) were put into a ball mill and ball milled for 5 days to prepare a slurry. The slurry was spin-coated on ITO at 1200 rpm for 30 seconds to form a coating film. When the transparency of the coating film was measured, the haze index was transparent at 4.9%.

Based on the transparency of the coating films above observed, it is seen that the hexagonal tungsten oxide formed according to the production method of the inventive concept was formed in a size small enough to be transparent simply with general ball milling.

For existing hexagonal tungsten oxide production methods, improvements were needed due to the following problems. In one method, a reducing atmosphere using a hydrogen atmosphere was required, making the production process unsafe. In a hydrothermal synthesis as another method, the production amount is small and conditions of high temperature and high pressure are required. In another method, separate organic solvents were essentially required.

In the inventive concept herein, hexagonal tungsten oxide may be produced using a production process enabling mass production without the conditions of high temperature and high pressure and without separate organic solvents.

A method for producing hexagonal tungsten oxide according to the inventive concept may allow producing hexagonal tungsten oxide without a high temperature and high pressure process.

Although the embodiments of the inventive concept have been described above with reference to the accompanying drawings, the inventive concept may be applied in other specific forms without changing the technical idea or essential features thereof. Therefore, it should be understood that the embodiments described above are exemplary in all respects and not restrictive.

What is claimed is:

1. A method for producing hexagonal tungsten oxide, the method comprising:
preparing an alkaline solvent having a pH of 8 to 9, which contains at least one of water or alcohol;
adding tungsten hexachloride ($WCl_6$) to the alkaline solvent to form a first reaction solution;
adding an additive to the first reaction solution to form a second reaction solution; and
adding strong acid to the second reaction solution to form nanoparticles,
wherein the additive includes any one of an amine compound having 1 to 8 carbon atoms or an aliphatic hydrocarbon derivative having 10 or more carbon atoms.

2. The method of claim 1, wherein the amine compound contains at least one of urea, monoethanolamine, aniline, or octylamine.

3. The method of claim 1, wherein the amine compound is added in an amount of about 300 mol % to about 1200 mol % of an added amount of the tungsten hexachloride.

4. The method of claim 1, wherein the aliphatic hydrocarbon derivative contains at least one of polyethylene glycol, poly(methyl methacrylate), polyacrylamide, polyvinyl alcohol, or hexadecylamine.

5. The method of claim 1, wherein the aliphatic hydrocarbon derivative is added in an amount of about 30 mol % to about 120 mol % of an added amount of the tungsten hexachloride.

6. The method of claim 1, wherein the preparing of the first reaction solution, the preparing of the second reaction solution, and the adding of strong acid to the second reaction solution are performed at a temperature from 60° C. to 80° C.

7. The method of claim 1, further comprising:
cooling the resultant mixture to room temperature after the adding of the strong acid to precipitate the nanoparticles;
separating the precipitated nanoparticles through a centrifugal separation method;
washing and drying the separated nanoparticles; and
heat treating the dried nanoparticles to form dry powder.

8. A method for producing an electrochromic device, the method comprising:
preparing an alkaline solvent having a pH of 8 to 9, which contains at least one of water or alcohol;
adding tungsten hexachloride ($WCl_6$) to the alkaline solvent to form a first reaction solution;
adding an additive to the first reaction solution to form a second reaction solution;
adding strong acid to the second reaction solution to form hexagonal tungsten oxide nanoparticles;
cooling the resultant mixture to room temperature after the adding of the strong acid to precipitate the hexagonal tungsten oxide nanoparticles;
separating the precipitated hexagonal tungsten oxide nanoparticles through a centrifugal separation method;
washing and drying the separated hexagonal tungsten oxide nanoparticles;
heat treating the dried hexagonal tungsten oxide nanoparticles to form dry powder;
mixing the dry powder with a solvent and weak acid to prepare a slurry;
applying the slurry onto a positive electrode to form a coating film;
disposing a negative electrode spaced apart from the positive electrode with the coating film therebetween; and
inserting an electrolyte between the coating film and the negative electrode, wherein the additive includes any one of an amine compound having 1 to 8 carbon atoms or an aliphatic hydrocarbon derivative having 10 or more carbon atoms.

9. The method of claim 8, wherein the weak acid contains at least one of tetraethyoxysilane (TEOS), acetic acid, or poly(methacrylic) acid.

10. A method for producing hexagonal tungsten oxide, the method comprising:
preparing a solvent containing at least one of water or alcohol;
adding an alkali salt to the solvent to form an alkaline solvent;
adding tungsten hexachloride ($WCl_6$) to the alkaline solvent to form a first reaction solution;
adding an additive to the first reaction solution to form a second reaction solution; and
adding strong acid to the second reaction solution to form nanoparticles,
wherein the additive contains at least one of urea, monoethanolamine, or polyethylene glycol, and
the number of moles of the added strong acid is greater than the sum of the number of moles of the tungsten chloride and the number of moles of the additive.

11. The method of claim 10, wherein the number of moles of the added strong acid is at least 1.1 times or more of the sum of the number of moles of the tungsten hexachloride and the number of moles of the additive.

12. The method of claim 10, wherein the alkaline solvent has a pH of 8 to 9.

13. The method of claim 10, wherein the forming of the alkaline solvent is performed at a temperature from 20° C. to 80° C.

14. The method of claim 10, wherein the preparing of the first reaction solution, the preparing of the second reaction solution, and the adding of strong acid to the second reaction solution are performed at a temperature from 60° C. to 80° C.

15. The method of claim 10, further comprising:
cooling the resultant mixture to room temperature after the adding of the strong acid to precipitate the nanoparticles;
separating the precipitated nanoparticles through a centrifugal separation method;
washing and drying the separated nanoparticles; and
heat treating the dried nanoparticles to form dry powder.

16. A method for producing hexagonal tungsten oxide, the method comprising:
preparing a solvent containing at least one of water or alcohol;
adding an alkali salt to the solvent to form an alkaline solvent having a pH of 8 to 9;
adding an additive to the alkaline solvent to form a first reaction solution;
adding tungsten hexachloride ($WCl_6$) to the first reaction solution to form a second reaction solution; and
adding strong acid to the second reaction solution to form nanoparticles,
wherein the additive contains at least one of urea, monoethanolamine, or polyethylene glycol, and the preparing of the first reaction solution, the preparing of the second reaction solution, and the adding of strong acid to the second reaction solution are performed at a temperature from 60° C. to 80° C.

\* \* \* \* \*